(12) United States Patent
Tatman et al.

(10) Patent No.: US 11,035,470 B2
(45) Date of Patent: Jun. 15, 2021

(54) MULTI-PLANE BRUSH SEAL

(71) Applicant: United Technologies Corporation, Farmington, CT (US)

(72) Inventors: Neil L. Tatman, Brentwood, NH (US); Shawn K. Hamilton, Berwick, ME (US)

(73) Assignee: Raytheon Technologies Corporation, Farmington, CT (US)

( * ) Notice: Subject to any disclaimer, the term of this patent is extended or adjusted under 35 U.S.C. 154(b) by 163 days.

(21) Appl. No.: 15/946,093

(22) Filed: Apr. 5, 2018

(65) Prior Publication Data

US 2019/0309855 A1 Oct. 10, 2019

(51) Int. Cl.
*F16J 15/3288* (2016.01)
*F01D 11/02* (2006.01)
*F01D 11/00* (2006.01)

(52) U.S. Cl.
CPC ......... *F16J 15/3288* (2013.01); *F01D 11/003* (2013.01); *F01D 11/02* (2013.01); *F05D 2220/32* (2013.01); *F05D 2240/56* (2013.01)

(58) Field of Classification Search
CPC .............. F16J 15/3288; F05D 2240/56; F05D 2220/32; F01D 11/003; F01D 11/02
See application file for complete search history.

(56) References Cited

U.S. PATENT DOCUMENTS

| | | | |
|---|---|---|---|
| 4,209,268 A * | 6/1980 | Fujiwara | E21D 9/0635 277/355 |
| 5,174,582 A | 12/1992 | Ferguson | |
| 5,335,920 A | 8/1994 | Tseng et al. | |
| 5,425,543 A * | 6/1995 | Buckshaw | F16J 15/3288 165/9 |
| 5,498,139 A | 3/1996 | Williams | |
| 5,975,535 A | 11/1999 | Gail et al. | |
| 6,173,958 B1 | 1/2001 | Dinc et al. | |
| 6,293,554 B1 | 9/2001 | Dinc et al. | |
| 6,352,263 B1 | 3/2002 | Gail et al. | |
| 6,457,719 B1 | 10/2002 | Fellenstein et al. | |

(Continued)

FOREIGN PATENT DOCUMENTS

| | | | | |
|---|---|---|---|---|
| DE | 3507638 A1 * | 9/1986 | | A46B 9/08 |
| EP | 0214192 A1 | 3/1987 | | |

(Continued)

OTHER PUBLICATIONS

EP search report for EP19155622.4 dated Jun. 28, 2019.

*Primary Examiner* — Eugene G Byrd
(74) *Attorney, Agent, or Firm* — Getz Balich LLC

(57) ABSTRACT

A multi-plane annular brush seal is provided. The brush seal includes a plurality of bristles attached to a front plate and a back plate. The back plate has a BP base end, a first BP inner side surface, a BP transition surface, a second BP inner side surface, and a BP tip end. The first BP inner side surface extends from the BP base end to the BP transition surface, and the second BP inner surface extends from the BP transition surface to the BP tip end. At any given circumferential position of the brush seal, the first BP inner side surface extends substantially parallel to a first plane, and the second BP inner side surface extends substantially parallel to a second plane. The first plane is skewed from the second plane by an obtuse angle.

19 Claims, 4 Drawing Sheets

(56) References Cited

U.S. PATENT DOCUMENTS

| | | | |
|---|---|---|---|
| 6,808,180 B2 | 10/2004 | Shore | |
| 8,596,973 B2 * | 12/2013 | Grondahl | F01D 11/003 415/231 |
| 9,255,486 B2 * | 2/2016 | Lu | F01D 11/001 |
| 9,587,505 B2 | 3/2017 | Mukhopadhyay et al. | |
| 10,400,896 B2 * | 9/2019 | Davis | F01D 25/246 |
| 2004/0100033 A1 * | 5/2004 | Tong | F16J 15/061 277/411 |
| 2015/0198251 A1 | 7/2015 | Beichl et al. | |
| 2017/0089215 A1 | 3/2017 | Zheng et al. | |
| 2018/0058241 A1 * | 3/2018 | Sarawate | F01D 5/02 |

FOREIGN PATENT DOCUMENTS

| | | | |
|---|---|---|---|
| FR | 2731490 A1 * | 9/1996 | F16J 15/3288 |
| JP | 03209068 A * | 9/1991 | F16J 15/3288 |
| JP | 2005337448 A * | 12/2005 | F16J 15/3288 |
| WO | WO8605252 A1 | 9/1986 | |
| WO | WO03091609 A1 | 3/1987 | |

\* cited by examiner

MULTI-PLANE BRUSH SEAL

This invention was made with Government support under Contract Number FA8650-09-D-2923-0021. The government therefore has certain rights in this invention.

BACKGROUND

1. Technical Field

This disclosure relates generally to fluid seals for turbine engines in general, and to brush seals in particular.

2. Background Information

Rotary machines such as turbine engines and compressors typically include a path through which a core gas (or other fluid) travels. Energy is introduced into the core gas, typically increasing the temperature and pressure of the core gas. Leakage from a high pressure region to a low pressure region is generally undesirable. Brush seals having a plurality of bristles sandwiched between a face plate and a back plate may be used to prevent or inhibit fluid flow from a high pressure region to a low pressure region. Typically, brush seals are deployed to seal a gap between static members, or between a static member and a dynamic member, and to seal between a high pressure region and a low pressure region. The brush seal is typically positioned so that the bristles extend across the gap between the respective members, with the free end of the bristles disposed adjacent a surface of one of the members. In those applications where a brush seal is utilized to provide a seal relative to a rotating member, the bristles may be circumferentially canted at an angle in the direction of rotation of the rotating member. Brush seals are designed to accommodate some transient movement of the sealing surface relative to the bristles. In some applications, the brush seal may be subject to turbulent air flow, which can cause the bristles to at least temporarily migrate out of position (e.g., flutter) and detrimentally affect their ability to seal. In some applications, the difference in pressure across the seal (i.e., the difference in pressure between the high pressure region and the low pressure region) can also cause the bristles to deflect and negatively affect their ability to seal. PCT Publication No. WO 03/091609 and European Patent No. 0214192 each describe examples of brush seals that are currently known. What is needed is a brush seal that can adequately seal in a relatively high pressure difference environment and/or one that can withstand a relatively high turbulent air environment and still adequately seal.

SUMMARY OF THE DISCLOSURE

According to a first aspect of the present disclosure, a multi-plane annular brush seal extending circumferentially about an axial centerline is provided. The brush seal includes a front plate, a back plate, and a plurality of bristles. The back plate ("BP") has a BP base end, a first BP inner side surface, a BP transition surface, a second BP inner side surface, and a BP tip end. The first BP inner side surface extends from the BP base end to the BP transition surface, and the second BP inner surface extends from the BP transition surface to the BP tip end. The plurality of bristles are attached to the front plate and the back plate at a base end of the brush seal. Each bristle has a first lengthwise portion extending from the base end, a second lengthwise portion, and a third lengthwise portion. The second lengthwise portion of each respective bristle is disposed between the first lengthwise portion and third lengthwise portion of the respective bristle. Each third lengthwise portion terminates in a tip end. At any given circumferential position of the brush seal, the first BP inner side surface extends substantially parallel to a first plane, and the second BP inner side surface extends substantially parallel to a second plane. The first plane is skewed from the second plane by an obtuse angle. The first lengthwise portions of the plurality of bristles extend substantially parallel to the first plane and the third lengthwise portions extend substantially parallel to the second plane. At least some of the bristles are in contact with the BP transition surface.

According to another aspect of the present disclosure, a multi-plane annular brush seal extending circumferentially about an axial centerline is provided. The brush seal includes a front plate, a back plate, and a plurality of bristles. The plurality of bristles are attached to the front plate and the back plate at a base end of the brush seal. Each bristle has a first lengthwise portion extending from the base end, a second lengthwise portion, and a third lengthwise portion. The second lengthwise portion of each respective bristle is disposed between the first lengthwise portion and third lengthwise portion of the respective bristle. Each third lengthwise portion terminates in a tip end. The front plate and back plate are configured to maintain the bristle first lengthwise portions substantially parallel to a first plane. The back plate is configured to maintain the second lengthwise portion of the bristles through a transition region, and to maintain the bristle third lengthwise portions substantially parallel to a second plane. The first plane is skewed from the second plane by an obtuse angle. At least some of the plurality of bristles are in contact with the back plate in the transition region.

In any of the aspects or embodiments described above and herein, the BP transition surface may be arcuately shaped.

In any of the aspects or embodiments described above and herein, at least some of the bristle first lengthwise portions are in contact with the first BP inner side surface, at least some of the bristle second lengthwise portions are in contact with the BP transition surface, and at least some of the bristle third lengthwise portions are in contact with the second BP inner side surface.

In any of the aspects or embodiments described above and herein, the plurality of bristles may include a subgroup of bristles, and for each bristle in the subgroup the first lengthwise portion is in contact with the first BP inner side surface, the second lengthwise portion is in contact with the BP transition surface, and the third lengthwise portion is in contact with the second BP inner side surface.

In any of the aspects or embodiments described above and herein, the plurality of bristles may include a subgroup of bristles, and each bristle in the subgroup is in contact with back plate for its entire length, except for a length of the third lengthwise portion extending beyond a BP tip end of the back plate.

In any of the aspects or embodiments described above and herein, the back plate may include a first BP inner side surface disposed adjacent the bristle first lengthwise portions, a BP transition surface disposed adjacent the bristle second lengthwise portions, and a second BP inner side surface disposed adjacent the bristle third lengthwise portions.

In any of the aspects or embodiments described above and herein, the first BP inner side surface may be skewed from the second BP inner side surface by an angle substantially equal to the obtuse angle.

In any of the aspects or embodiments described above and herein, at least some of the bristle first lengthwise portions are in contact with the first BP inner side surface, at least some of the bristle second lengthwise portions are in contact with the BP transition surface, and at least some of the bristle third lengthwise portions are in contact with the second BP inner side surface.

In any of the aspects or embodiments described above and herein, the plurality of bristles includes a subgroup of bristles, and for each bristle in the subgroup the first lengthwise portion is in contact with the first BP inner side surface, the second lengthwise portion is in contact with the BP transition surface, and the third lengthwise portion is in contact with the second BP inner side surface.

In any of the aspects or embodiments described above and herein, the plurality of bristles includes a subgroup of bristles, and each bristle in the subgroup is in contact with back plate for its entire length, except for a length of the third lengthwise portion extending beyond a BP tip end of the back plate.

The foregoing features and the operation of the present disclosure will become more apparent in light of the following description and the accompanying drawings.

DETAILED DESCRIPTION

Figure 1:
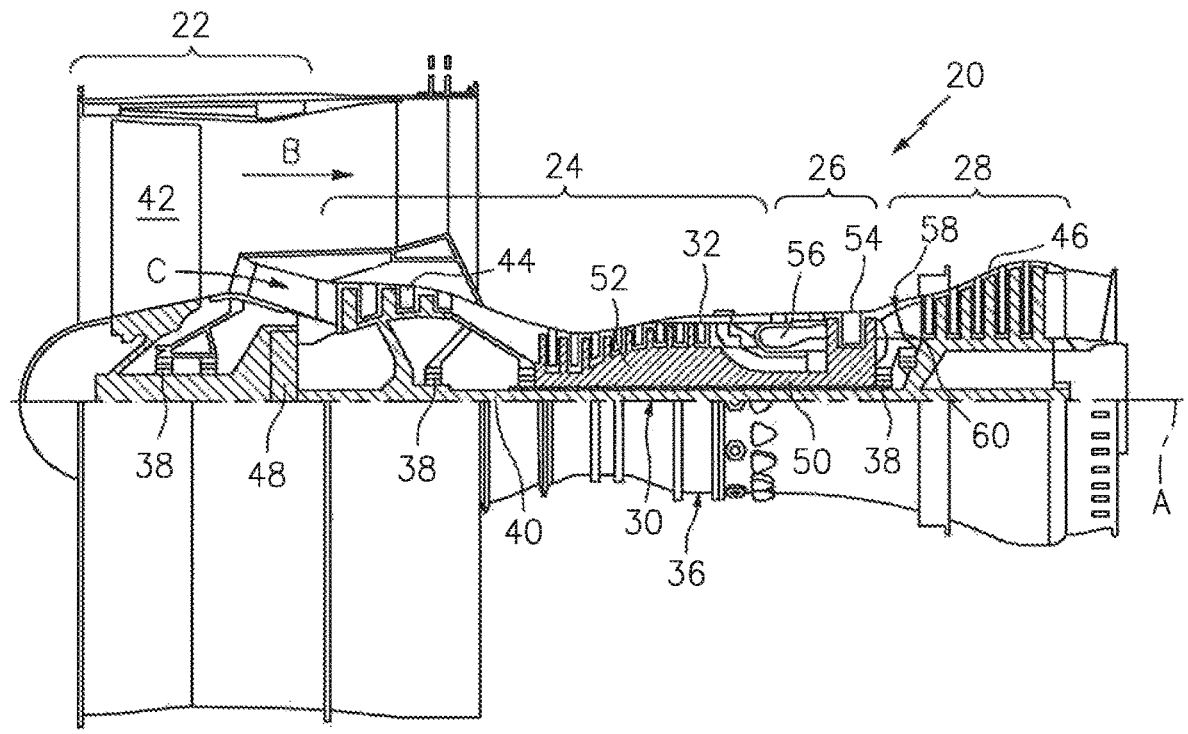
FIG. 1 is a diagrammatic partially sectioned view of a gas turbine engine.

It is noted that various connections are set forth between elements in the following description and in the drawings (the contents of which are included in this disclosure by way of reference). It is noted that these connections are general and, unless specified otherwise, may be direct or indirect and that this specification is not intended to be limiting in this respect. A coupling between two or more entities may refer to a direct connection or an indirect connection. An indirect connection may incorporate one or more intervening entities.

To facilitate the description of the present disclosure a two-spool turbofan type gas turbine engine 20 is shown (e.g., see FIG. 1). This exemplary embodiment of a gas turbine engine includes a fan section 22, a compressor section 24, a combustor section 26, and a turbine section 28. The fan section 22 drives air along a bypass flow path "B" in a bypass duct, while the compressor section 24 drives air along a core flow path "C" for compression and communication into the combustor section 26 then expansion through the turbine section 28. Although a two-spool turbofan gas turbine engine is described herein to facilitate the description of the present disclosure, it should be understood that the present disclosure is not limited to use with two-spool turbofans as the teachings may be applied to other types of turbine engines; e.g., three-spool architectures.

The exemplary engine 20 shown in FIG. 1 includes a low speed spool 30 and a high speed spool 32 mounted for rotation about an engine central longitudinal axis "A" relative to an engine static structure 36 via several bearing systems 38. It should be understood that the location, number, and characteristics of bearing systems 38 may vary to suit the particular application.

The low speed spool 30 generally includes an inner shaft 40 that interconnects a fan 42, a low pressure compressor 44 and a low pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a high pressure compressor 52 and high pressure turbine 54. A combustor 56 is arranged in the exemplary gas turbine 20 between the high pressure compressor 52 and the high pressure turbine 54. The inner shaft 40 and the outer shaft 50 are concentric and rotate via bearing systems 38 about the engine central longitudinal axis "A" which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and geared architecture 48 may be varied. For example, geared architecture 48 may be located aft of combustor section 26 or even aft of turbine section 28, and fan section 22 may be positioned forward or aft of the location of geared architecture 48.

The gas turbine engine 20 diagrammatically depicted in FIG. 1 is one example of a high-bypass geared aircraft engine. In other examples, the gas turbine engine 20 may have a bypass ratio that is greater than about six (6), with an example embodiment being greater than about ten (10), the geared architecture 48 may be an epicyclic gear train, such as a planetary gear system or other gear system, with a gear reduction ratio of greater than about 2.3 and the low pressure turbine 46 may have a pressure ratio that is greater than about five (5:1). In one disclosed embodiment, the gas turbine engine 20 bypass ratio is greater than about ten (10:1), the fan diameter is significantly larger than that of the low pressure compressor 44, and the low pressure turbine 46 has a pressure ratio that is greater than about five (5:1). The low pressure turbine 46 pressure ratio is pressure measured prior to inlet of the low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one or more embodiments of a geared architecture engine and that the present disclosure is applicable to other gas turbine engines including direct drive turbofans.

According to an aspect of the present disclosure, a brush seal 60 is provided configured to provide a fluid seal between a high pressure region ("HP") and a low pressure region ("LP") as may be present within a gas turbine engine as described above, but is not limited to such an application.

Figure 2:
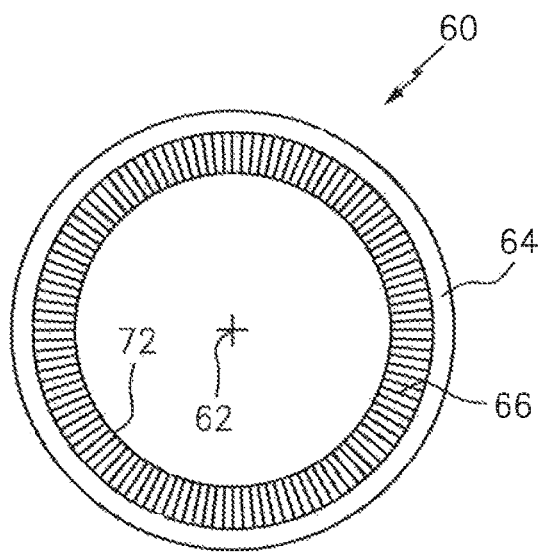
FIG. 2 is a diagrammatic planar view of a brush seal embodiment.
Figure 3:
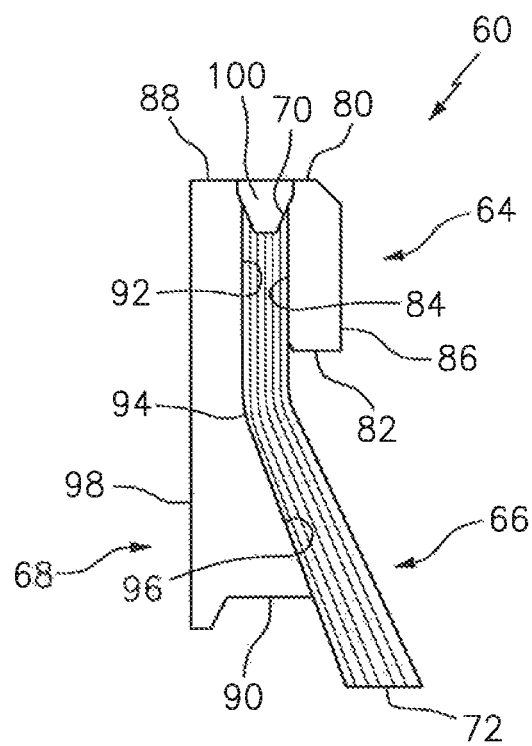
FIG. 3 is a sectioned partial view of a brush seal embodiment.

In the embodiment shown in FIGS. 2 and 3, the brush seal 60 is a multi-plane brush seal 60 having an annular configuration that extends continuously around a circumference, and is centered about an axial centerline 62. The brush seal 60 may be a unitary annular element or it may be an annular assembly formed from a plurality of segments. The brush seal 60 includes a front plate 64 ("FP"), a plurality of bristles 66, and a back plate 68 ("BP").

Figure 4:
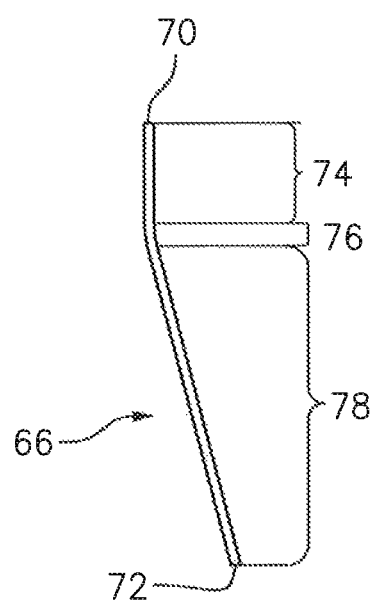
FIG. 4 is a diagrammatic view of a bristle embodiment.

Referring to FIGS. 3 and 4, the plurality of bristles 66 includes a sufficient number of individual bristles 66 to form a body of bristles 66 that extends around the circumference of the brush seal 60. The present disclosure is not limited to any particular individual bristle 66 geometric configuration. In some embodiments, all of the bristles 66 may have the same geometric configuration; e.g., a constant diameter cylindrical geometry, same length etc. In some embodiments, some of the bristles 66 may have a first geometric configuration (e.g., a first diameter, a first length, etc.), and other bristles 66 may have a second geometric configuration (e.g., a second diameter, different than the first diameter, a second length different from the first length, etc.). Each of the plurality of bristles 66 (e.g., see FIG. 4) is a unitary body that extends lengthwise between a distal end 70 and an opposite tip end 72. Each of the bristles 66 may be described as having a first lengthwise portion 74 (extending from the distal end 70), a second lengthwise portion 76, and a third lengthwise portion 78 (extending to the tip end 72). The second lengthwise portion 76 of each bristle 66 is disposed between the first lengthwise portion 74 and third lengthwise portion 78. The present disclosure is not limited to any particular bristle material. Non-limiting examples of acceptable bristle materials include metal alloys such as stainless steel or bronze wire, or synthetic fibers such as of Kevlar, etc.

In the brush seal 60 embodiment shown in FIG. 3, the front plate 64 has a FP base end 80, a FP distal end 82, a FP inner surface 84, and an FP outer surface 86. The FP inner surface 84 and the FP outer surface 86 both extend between the FP base end 80 and the FP distal end 82. The present disclosure is not limited to this front plate 64 embodiment.

The back plate 68 has a BP base end 88, a BP tip end 90, a first BP inner side surface 92, a BP inner side transition surface 94, a second BP inner side surface 96, and a BP outer surface 98. The first BP inner side surface 92 extends between the BP base end 88 and the BP inner side transition surface 94. The second BP inner side surface 96 extends from the BP inner side transition surface 94 to the BP tip end 90. The BP outer surface 98 extends from the BP base end 88 to the BP tip end 90. The BP inner side transition surface 94 is the surface portion that transitions (e.g., arcuately) from the first BP inner side surface 92 to the second BP inner side surface.

The plurality of bristles 66 are disposed between the front plate 64 and the back plate 68, and are attached to both the front plate 64 and back plate 68 adjacent the distal ends 70 of the bristles 66. In the embodiment shown in FIG. 3, the bristles 66, front plate 64, and back plate 68 are joined to one another by a bead of welding 100 that extends around the circumference of the brush seal 60. The present brush seal 60 is not limited to attachment via welding; e.g., alternative attachment mechanisms include brazing, bonding, soldering, adhesives, etc.

The plurality of bristles 66 extend beyond the BP tip end 90 of the back plate 68; i.e., an "exposed length" of the third lengthwise portion 78 of each bristle extends beyond the BP tip end 90 of the back plate 68. In some applications, fluids within the operating environment of the brush seal 60 can act on the bristles 66 (i.e., fluid forces sometimes referred to as "windage", often present in high speed shaft applications), causing them to deflect and negatively affect the functionality of the brush seal 60. The back plate 68, which supports substantially all of the length of the bristles 66 (except for the exposed length) and having a BP tip end 90 that is disposed a relatively small separation distance "D" from the sealing surface 102 (see FIG. 5), provides windage protection to the bristles 66.

Figure 6:
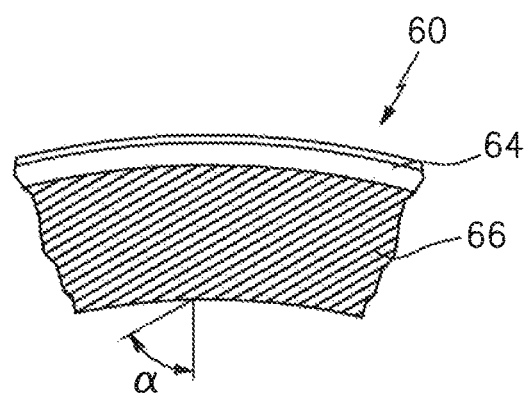
FIG. 6 is a diagram planar partial view of a brush seal embodiment showing bristles in an angled orientation.

In some embodiments, the plurality of bristles 66 may be disposed to lie in a radial plane; e.g., as shown in FIG. 2. In some embodiments, the plurality of bristles 66 may be disposed to extend at a non-radial orientation (e.g., an acute angle "α") relative to the sealing surface; e.g., see FIG. 6.

Figure 7:
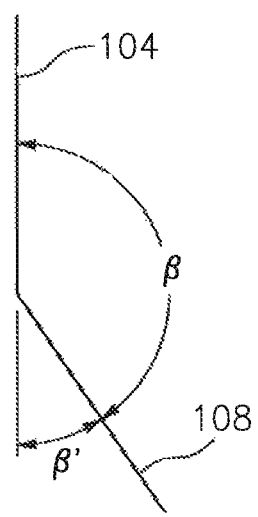
FIG. 7 is a diagram illustrating the angles disposed between the first plane and the second plane.

FIG. 3 is a diagrammatic cross-sectional partial view of an embodiment of the present brush seal 60, which cross-section is taken along a plane that extends through the axial centerline 62 of the brush seal 60. At any given circumferential position of the brush seal 60, the back plate 68 is configured to maintain the bristle first lengthwise portions 74 substantially parallel to a first plane 104, to maintain the second lengthwise portion 76 of the bristles 66 through a transition region 106 (e.g., an arcuate transition region), and to maintain at least a length of the bristle third lengthwise portions 78 substantially parallel to a second plane 108. The first plane 104 and second plane 108 are skewed from one another by an obtuse angle "β". The range of obtuse angles currently believed to provide adequate sealing performance is about 175 to 150 degrees (175°-150°). FIG. 7 diagrammatically shows the first plane 104 skewed from the second plane 108 by the obtuse angle β, and also shows the supplementary angle β' (i.e., β range about 175°-150°, and the β' range about 5°-30°). In the embodiment shown in FIG. 3, the bristle first lengthwise portions 74 and the first BP inner side surface 92 extend in a direction substantially parallel to the first plane 104. Also in the embodiment shown in FIG. 3, the bristle third lengthwise portions 78 and the second BP inner side surface extend in a direction substantially parallel to the second plane 108.

At least some of the bristles 66 are maintained in contact with the first BP inner side surface 92, the BP inner side transition surface 94, and at least a portion of the second BP inner side surface 96. The bristle first lengthwise portion 74 of the bristles 66 are, therefore, disposed between and positionally maintained by the inner surfaces 84, 92 of the front and back plates 64, 68; e.g., along the first plane 104. The bristle second lengthwise portions 76 are supported by the back plate 68. A substantial portion of the bristle third lengthwise portions 78 are supported by the back plate 68; e.g., along the second plane 108.

In the brush seal 60 embodiment shown in FIG. 3, the first plane 104 is substantially perpendicular to the axial centerline 62 of the brush seal 60. As indicated above, the second plane 108 is skewed from the first plane 104 by an obtuse angle "β". As a result, in the embodiment shown in FIG. 5 the portion of the brush seal 60 extending along the second plane 108 (i.e., at least a portion of the second BP inner side surface 96 and at least a length of the bristle third lengthwise portions 78) forms a truncated cone shape. FIG. 7 diagrammatically illustrates the relationship between the first plane 104 and the second plane 108. In this diagram, the first plane 104 extends perpendicularly out of the page, the second plane 108 extends perpendicularly out of the page (i.e., it is tangential to the truncated cone shape at the given circumferential position), and the first and second planes 104, 108 are skewed from one another by the obtuse angle "β".

The first plane 104 need not, however, be substantially perpendicular to the axial centerline 62; e.g., the first BP inner side surface 92, the bristle first lengthwise portions 74, and the front plate 64 may be oriented to be non-perpendicular to the axial centerline 62 of the brush seal 60. In these embodiments, the first BP inner side surface 92, the bristle first lengthwise portions 74 and the FP inner surface 84 are parallel one another, but collectively form a truncated cone shape. In similar manner as described above using the diagram of FIG. 7, at any given circumferential position of the brush seal 60 the first and second planes 104, 108 are skewed from one another by the obtuse angle "β".

Figure 5:
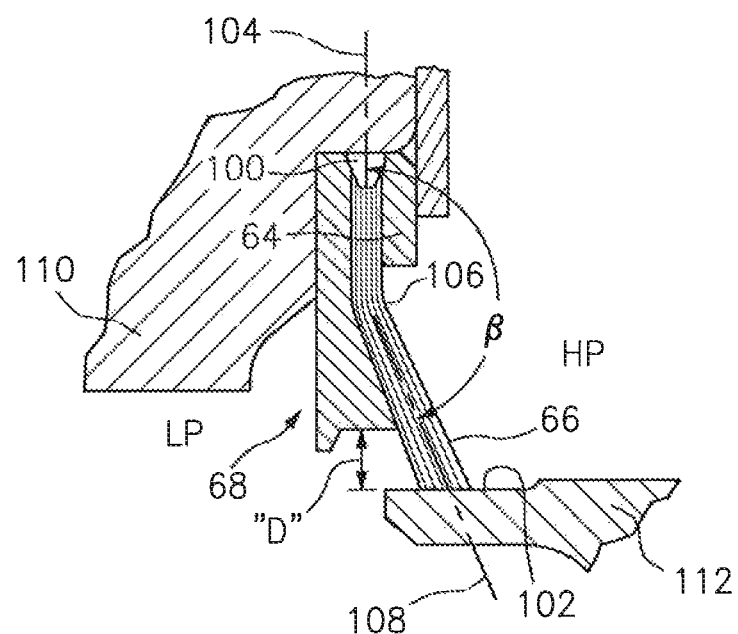
FIG. 5 is a sectioned partial view of a brush seal embodiment mounted on a first element, disposed to seal relative to a second element.

Referring to FIG. 5, embodiments of the present brush seal 60 may be configured to create a seal between two static structures, between a static structure and a dynamic structure (e.g., a rotating structure), or between two dynamic structures. The diagrammatic illustration shown in FIG. 3 depicts a brush seal 60 embodiment attached to a first structure 110 and sealing relative to the sealing surface 102 of a second structure 112; e.g., in a gas turbine engine, the first structure 110 may be static and the second structure 112 may be rotating. The brush seal 60 is disposed to seal between a high pressure region ("HP") and a low pressure region ("LP"). The configuration of the present brush seal 60 allows the brush seal 60 to be utilized in a relatively small axial space. For example, the plurality of bristles 66 (which are attached to the base end of the brush seal 60) are constrained and deflected an angle "β" by the back plate 68. This configuration is significant in that the bristles 66 extending out from the attachment region (e.g., the weld) are constrained and supported not only by the back plate 68 and front plate 64 in the first plane 104 region, but also by the back plate 68 through the transition region 106, and in at least a portion of the second plane 108 region. Prior art brush seals of which we are aware having bristles 66 that are deflected, often only support the bristles 66 in the base region adjacent the attachment (e.g., the weld). Hence, the deflected bristles 66 are cantilevered from the base region and can flex about the base region. The bristles 66 in this type of brush seal configuration may be subject to elevated stress concentration at the point of exit from the base region. Embodiments of the present brush seal 60, in contrast, constrain and support the bristles 66 not only in the base region (i.e., the first plane 104 region), but also through the transition region 106, and in at least a portion of the second plane 108 region, thereby mitigating any potential stress concentrations within the bristles 66.

Referring to FIG. 5, during operation of the device in which the brush seal 60 is utilized (e.g., a gas turbine engine), air pressure in the high pressure region ("HP"; contiguous with the front plate 64 of the brush seal 60) acts on the bristles 66 forcing the bristles 66 against the back plate 68 and toward the low pressure region ("LP"). As indicated above, in some applications fluids within the operating environment of the brush seal 60 can act on the bristles 66 (i.e., "windage", often present in high speed shaft applications), causing the bristles 66 to deflect out of position and negatively affect the functionality of the brush seal 60. The back plate 68 with its BP tip end 90 disposed at a relatively small radial distance "D" from the sealing surface supports the bristles 66 along substantially all of their length and provide windage protection to the bristles 66, thereby mitigating undesirable bristle deflection.

While various embodiments of the present disclosure have been disclosed, it will be apparent to those of ordinary skill in the art that many more embodiments and implementations are possible within the scope of the present disclosure. For example, the present disclosure as described herein includes several aspects and embodiments that include particular features. Although these features may be described individually, it is within the scope of the present disclosure that some or all of these features may be combined with any one of the aspects and remain within the scope of the present disclosure. Accordingly, the present disclosure is not to be restricted except in light of the attached claims and their equivalent

What is claimed is:

1. A multi-plane annular brush seal extending circumferentially about an axial centerline, the brush seal comprising:
   a front plate;
   a back plate having a BP base end, a first BP inner side surface, a BP inner side transition surface, a second BP inner side surface, and a BP tip end, wherein the first BP inner side surface extends from the BP base end to the BP inner side transition surface, and the second BP inner surface extends from the BP inner side transition surface to the BP tip end; and
   a plurality of bristles attached to the front plate and the back plate at a base end of the brush seal, wherein each bristle has a first lengthwise portion extending from the base end, a second lengthwise portion, and a third lengthwise portion, and the second lengthwise portion of each respective bristle is disposed between the first lengthwise portion and third lengthwise portion of the respective bristle, and each third lengthwise portion terminates in a tip end;
   wherein at any given circumferential position of the brush seal, the first BP inner side surface extends substantially parallel to a first plane, and the second BP inner side surface extends substantially parallel to a second plane, wherein the first plane is skewed from the second plane by an obtuse angle that is between one hundred and seventy-five degrees and one hundred and fifty degrees, and the first lengthwise portions of the plurality of bristles extend substantially parallel to the first plane and the third lengthwise portions extend substantially parallel to the second plane;
   wherein at least some of the bristles are in contact with the BP inner side transition surface; and
   wherein a first of the bristles comprises a metal bristle.

2. The multi-plane annular brush seal of claim 1, wherein the BP inner side transition surface is arcuately shaped.

3. The multi-plane annular brush seal of claim 1, wherein at least some of the bristle first lengthwise portions are in contact with the first BP inner side surface, at least some of the bristle second lengthwise portions are in contact with the BP inner side transition surface, and at least some of the bristle third lengthwise portions are in contact with the second BP inner side surface.

4. The multi-plane annular brush seal of claim 1, wherein the plurality of bristles includes a subgroup of bristles, and for each bristle in the subgroup the first lengthwise portion is in contact with the first BP inner side surface, the second lengthwise portion is in contact with the BP inner side transition surface, and the third lengthwise portion is in contact with the second BP inner side surface.

5. The multi-plane annular brush seal of claim 1, wherein the plurality of bristles includes a subgroup of bristles, and each bristle in the subgroup is in contact with back plate for its entire length, except for a length of the third lengthwise portion extending beyond a BP tip end of the back plate.

6. An assembly for a gas turbine engine, the assembly comprising:
   a first static structure;

a second static structure; and a multi-plane annular brush seal configured to seal a gap between the first static structure and the second static structure, the multi-plane annular brush seal attached to the first static structure and sealingly engaged with the second static structure, the multi-plane annular brush seal extending circumferentially about an axial centerline, and the multi-plane annular brush seal comprising a front plate, a back plate and a plurality of bristles attached to the front plate and the back plate at a base end of the multi-plane annular brush seal;

wherein each bristle has a first lengthwise portion extending from the base end, a second lengthwise portion, and a third lengthwise portion, and the second lengthwise portion of each respective bristle is disposed between the first lengthwise portion and third lengthwise portion of the respective bristle, and each third lengthwise portion terminates in a tip end;

wherein the front plate and back plate are configured to maintain the bristle first lengthwise portions substantially parallel to a first plane; and wherein the back plate is configured to maintain the second lengthwise portion of the bristles through a transition region, and to maintain the bristle third lengthwise portions substantially parallel to a second plane;

wherein the first plane is skewed from the second plane by an obtuse angle that is between one hundred and seventy-five degrees and one hundred and fifty degrees; and wherein at least some of the bristles are in contact with the back plate in the transition region.

7. The assembly of claim 6, wherein the transition region is arcuately shaped.

8. The assembly of claim 7, wherein the back plate includes a first BP inner side surface disposed adjacent the bristle first lengthwise portions, a BP inner side transition surface disposed adjacent the bristle second lengthwise portions, and a second BP inner side surface disposed adjacent the bristle third lengthwise portions.

9. The assembly of claim 8, wherein the first BP inner side surface is skewed from the second BP inner side surface by an angle substantially equal to the obtuse angle.

10. The assembly of claim 9, wherein at least some of the bristle first lengthwise portions are in contact with the first BP inner side surface, at least some of the bristle second lengthwise portions are in contact with the BP inner side transition surface, and at least some of the bristle third lengthwise portions are in contact with the second BP inner side surface.

11. The assembly of claim 9, wherein the plurality of bristles includes a subgroup of bristles, and for each bristle in the subgroup the first lengthwise portion is in contact with the first BP inner side surface, the second lengthwise portion is in contact with the BP inner side transition surface, and the third lengthwise portion is in contact with the second BP inner side surface.

12. The assembly of claim 9, wherein the plurality of bristles includes a subgroup of bristles, and each bristle in the subgroup is in contact with back plate for its entire length, except for a length of the third lengthwise portion extending beyond a BP tip end of the back plate.

13. An assembly for a gas turbine engine, the assembly comprising:

a multi-plane annular brush seal extending circumferentially about an axial centerline, the multi-plane annular brush seal comprising a front plate, a back plate and a plurality of bristles attached to the front plate and the back plate at a base end of the multi-plane annular brush seal;

each of the bristles including a first lengthwise portion, a second lengthwise portion and a third lengthwise portion, the first lengthwise portion extending from the base end, the second lengthwise portion between the first lengthwise portion and third lengthwise portion, and the third lengthwise portion extending to a tip end;

the front plate and the back plate configured to maintain the first lengthwise portion of each of the bristles substantially parallel to a first plane;

the back plate configured to maintain the second lengthwise portion of each of the bristles through a transition region, and the back plate further configured to maintain the third lengthwise portion of each of the bristles substantially parallel to a second plane;

the first plane skewed from the second plane by an angle greater than or equal to one hundred and fifty degrees; and at least some of the bristles in contact with the back plate in the transition region.

14. The assembly of claim 13, wherein the angle is less than or equal to one hundred and seventy-five degrees.

15. The assembly of claim 13, wherein a first of the bristles comprises a metal bristle.

16. The assembly of claim 13, further comprising:
a first static structure of the gas turbine engine; and
a second static structure of the gas turbine engine;
the multi-plane annular brush seal configured to create a seal between the first static structure and the second static structure, and the multi-plane annular brush seal attached to the first static structure and sealing engaged with the second static structure.

17. The assembly of claim 13, further comprising:
a static structure of the gas turbine engine; and
a rotating structure of the gas turbine engine;
the multi-plane annular brush seal configured to create a seal between the static structure and the rotating structure, and the multi-plane annular brush seal attached to the static structure and sealing engaged with the rotating structure.

18. The assembly of claim 13, wherein the assembly is configured such that
the front plate is configured adjacent a first plenum within the gas turbine engine;
the back plate is configured adjacent a second plenum within the gas turbine engine; and
during operation of the gas turbine engine, a fluid pressure within the first plenum is greater than a fluid pressure within the second plenum.

19. The assembly of claim 6, wherein a first of the bristles is configured as a metal bristle.

* * * * *